(12) United States Patent
Zhou et al.

(10) Patent No.: US 11,540,332 B2
(45) Date of Patent: Dec. 27, 2022

(54) COMMUNICATION METHOD AND DEVICE

(71) Applicant: Huawei Technologies Co., Ltd., Shenzhen (CN)

(72) Inventors: Han Zhou, Shanghai (CN); Meng Hua, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 47 days.

(21) Appl. No.: 17/179,743

(22) Filed: Feb. 19, 2021

(65) Prior Publication Data

US 2021/0176798 A1 Jun. 10, 2021

Related U.S. Application Data

(63) Continuation of application No. PCT/CN2019/101412, filed on Aug. 19, 2019.

(30) Foreign Application Priority Data

Aug. 20, 2018 (CN) .......................... 201810950039.8

(51) Int. Cl.
*H04W 74/08* (2009.01)
*H04W 28/08* (2009.01)

(52) U.S. Cl.
CPC .... *H04W 74/0841* (2013.01); *H04W 28/0858* (2020.05)

(58) Field of Classification Search
CPC ......... H04W 74/0841; H04W 74/0833; H04W 28/085; H04W 74/004; H04L 5/0048
See application file for complete search history.

(56) References Cited

U.S. PATENT DOCUMENTS

| 10,785,802 | B2 * | 9/2020 | Basu Mallick | ... H04W 74/0833 |
| 11,284,400 | B2 * | 3/2022 | Zhou | ...................... H04L 5/001 |
| 2017/0063703 | A1 | 3/2017 | Mani et al. | |
| 2018/0049068 | A1 | 2/2018 | Agiwal et al. | |
| 2019/0313348 | A1 * | 10/2019 | MolavianJazi | ..... H04W 52/365 |

(Continued)

FOREIGN PATENT DOCUMENTS

| CN | 108012329 A | 5/2018 |
| CN | 108391314 A | 8/2018 |

(Continued)

OTHER PUBLICATIONS

Samsung, "Further considerations for bandwidth part," 3GPP TSG-RAN WG2 NR 2018AH#1 Meeting, Vancouver, Canada, Jan. 22-26, 2018, R2-1801465, 5 pages.

(Continued)

*Primary Examiner* — Ahmed Elallam
(74) *Attorney, Agent, or Firm* — Conley Rose, P.C.

(57) ABSTRACT

A communication method includes determining, by a terminal side device in a mobile communications system, N random access preambles on N uplink bandwidth parts (BWPs) in a random access process, where N is an integer greater than or equal to 2, and sending, by the terminal side device, the N random access preambles to a network side device so that the terminal side device can perform random access on a plurality of uplink BWPs. In this method, the network side device or each terminal side device may subsequently perform random access on any one of the N uplink BWPs.

15 Claims, 9 Drawing Sheets

(56) References Cited

U.S. PATENT DOCUMENTS

| | | | |
|---|---|---|---|
| 2020/0128588 A1* | 4/2020 | Xiong | H04B 7/0617 |
| 2020/0221508 A1 | 7/2020 | Huang et al. | |
| 2020/0229180 A1* | 7/2020 | Liu | H04L 5/0051 |
| 2021/0014903 A1* | 1/2021 | Zhang | H04W 74/0833 |
| 2021/0144715 A1* | 5/2021 | Gotoh | H04W 72/0493 |
| 2021/0251017 A1* | 8/2021 | Chen | H04W 74/0833 |
| 2021/0274550 A1* | 9/2021 | Zhang | H04W 74/0816 |
| 2021/0282192 A1* | 9/2021 | Jiang | H04W 48/16 |

FOREIGN PATENT DOCUMENTS

| | | |
|---|---|---|
| CN | 109587789 A | 4/2019 |
| WO | 2018086600 A1 | 5/2018 |
| WO | WO-2019087359 A1 * | 5/2019 |

OTHER PUBLICATIONS

ZTE, "Impacts on MAC for NR-U operation," R2-1811282, 3GPP TSG RAN WG2 NR #103 Meeting, Gothenburg, Sweden, Aug. 20-24, 2018, 4 pages.

ZTE, "Considerations on channel access procedure for NR-U," 3GPP TSG RAN WG2 NR #103 Meeting, R2-1811281, Cothenburg, Sweden, Aug. 20-24, 2018, 4 pages.

R2-1813874, Spreadtrum Communications, "Random Access Procedure in NR-U," 3GPP TSG-RAN WG2 Meeting #103bis, Chengdu, China, Oct. 8-12, 2018, 5 pages.

R2-1816829, ZTE, "Considerations on 4-step RACH procedure for NR-U," 3GPP TSG RAN WG2 NR #104 Meeting, Spokane, US, Nov. 12-16, 2018, 6 pages.

* cited by examiner

COMMUNICATION METHOD AND DEVICE

CROSS-REFERENCE TO RELATED APPLICATIONS

This application is a continuation of International Patent Application No. PCT/CN2019/101412 filed on Aug. 19, 2019, which claims priority to Chinese Patent Application No. 201810950039.8 filed on Aug. 20, 2018. The disclosures of the aforementioned applications are hereby incorporated by reference in their entireties.

TECHNICAL FIELD

This application relates to the field of communications technologies, and in particular, to a communication method and a device.

BACKGROUND

With the development of a fifth generation (5G) mobile communications system (or a New Radio (NR) system), a concept of a bandwidth part (BWP) is introduced into the NR system. One BWP is a segment of consecutive frequency domain resources on one carrier used by one cell, and one carrier may include a plurality of BWPs. After a terminal side device successfully accesses a cell, a network side device configures, on a carrier used by the cell, at least one BWP on a specific carrier for the terminal side device, where a frequency domain width of each BWP is less than maximum bandwidth supported by the terminal side device.

In the NR system, the network side device broadcasts a system message in a managed cell, and the system message includes random access configuration information of the cell, such as a frequency resource corresponding to an uplink BWP and a random access preamble resource pool on the uplink BWP such that the terminal side device accesses the cell using a random access process.

Because the terminal side device and another terminal side device within a coverage area of the same cell as the terminal side device obtain same random access configuration information from the system message of this cell, there is a relatively large probability that random access fails because a contention conflict occurs in the random access process of the terminal side device.

SUMMARY

This application provides a communication method and a device, to reduce a probability of a random access failure caused when a contention conflict occurs in a random access process of a terminal side device in a mobile communications system.

According to a first aspect, this application provides a communication method, and the method includes a terminal side device determines a random access preamble on each of N uplink BWPs in one random access process, and sends the random access preamble on each uplink BWP to a network side device, where N is an integer greater than or equal to 2.

Based on the foregoing method, any terminal side device can send random access preambles on the N uplink BWPs to the network side device in one random access process such that the terminal side device can perform random access on a plurality of uplink BWPs, thereby increasing a random access opportunity of the terminal side device. Because the network side device or each terminal side device may subsequently perform random access on any one of the N uplink BWPs, this method can reduce a phenomenon that a contention conflict occurs between each terminal side device and another terminal side device in a random access process, thereby improving a success probability of random access of each terminal side device.

In a possible design, a specific method for the terminal side device to determine the random access preamble on each uplink BWP may be that the terminal side device determines the random access preamble on each uplink BWP from at least one random access preamble (which may belong to a same random access preamble resource pool). In this way, the terminal side device can successfully determine the random access preamble on each uplink BWP.

In a possible design, a specific method for the terminal side device to send the random access preamble on each uplink BWP to the network side device may be that the terminal side device determines a frequency resource and a time resource corresponding to each uplink BWP, and sends the random access preamble on each uplink BWP to the network side device using the frequency resource and the time resource corresponding to each uplink BWP.

Based on the foregoing method, by sending the random access preamble on each uplink BWP using the frequency resource and the time resource corresponding to each uplink BWP, the terminal side device can successfully send the random access preamble on each uplink BWP.

In a possible design, time resources corresponding to the uplink BWPs do not overlap.

In a possible design, if a sum of uplink power on any two of the N uplink BWPs is greater than total uplink power available to the terminal side device, the terminal side device determines that the time resources corresponding to the uplink BWPs do not overlap. In this way, the terminal side device can easily and flexibly determine, in the foregoing manner, that the time resources corresponding to the uplink BWPs do not overlap.

In a possible design, an optional method for the terminal side device to send the random access preamble on each uplink BWP to the network side device may be that the terminal side device sends a random access preamble on an $i^{th}$ uplink BWP, and sends random access preambles on an $(i+1)^{th}$ uplink BWP to an $N^{th}$ uplink BWP within a random access response time window corresponding to the random access preamble on the $i^{th}$ uplink BWP, where i is any integer from 1 to N−2.

Based on the foregoing method, the terminal side device may send a plurality of subsequent random access preambles within a random access response time window corresponding to a specific random access preamble.

In a possible design, an optional method for the terminal side device to send the random access preamble on each uplink BWP to the network side device may be that the terminal side device sends a random access preamble on a $j^{th}$ uplink BWP, and sends a random access preamble on a $(j+1)^{th}$ uplink BWP within a random access response time window corresponding to the random access preamble on the $j^{th}$ uplink BWP, where j is any integer from 1 to N−1.

Based on the foregoing method, the terminal side device may send a random access preamble within a random access response time window corresponding to a previous random access preamble.

In a possible design, time resources corresponding to at least two uplink BWPs in the N uplink BWPs overlap.

In a possible design, if a sum of uplink power on the at least two uplink BWPs is less than or equal to total uplink power available to the terminal side device, the terminal side device determines that the time resources corresponding to the at least two uplink BWPs overlap. In this way, the terminal side device can easily and flexibly determine, in the foregoing manner, that the time resources corresponding to all the uplink BWPs overlap.

In a possible design, after sending the random access preamble on each uplink BWP to the network side device, the terminal side device receives M random access responses sent by the network side device, selects a first random access response from the M random access responses, and sends a first message to the network side device based on the first random access response, where M is a positive integer less than or equal to N, and the first message requests contention conflict resolution for random access corresponding to the first random access response.

Based on the foregoing method, the terminal side device may notify the network side device of an uplink BWP on which the terminal side device chooses to perform random access, to be specific, the terminal side device chooses to perform random access on an uplink BWP used to send a random access preamble to which the first random access response responds. In this way, any terminal side device can select, in a random access process, an appropriate uplink BWP from the N BWPs by selecting the first random access response, and due to uncertainty of an actual scenario, a probability that different terminal side devices select a same first random access response is relatively low, that is, a probability that different terminal side devices choose to perform random access on a same uplink BWP is relatively low. In this way, a phenomenon that a contention conflict occurs between each terminal side device and another terminal side device in a random access process can be reduced such that a success probability of random access of each terminal side device can be improved.

In a possible design, the first random access response is the first random access response received by the terminal side device within a preset first time window, a random access response of best signal quality within a preset second time window, or a random access response that is randomly selected.

In the foregoing manner, when the first random access response is the first random access response received by the terminal side device within the preset first time window, it can be ensured that the terminal side device performs random access on an uplink BWP with a fastest response speed, a delay of resolving a contention conflict corresponding to the first random access response by the terminal side device can be reduced, and the terminal side device can access, as quickly as possible, a cell managed by the network side device, and when the first random access response is the random access response of the best signal quality within the preset second time window, it can be ensured that the terminal side device performs random access on an uplink BWP of best channel quality, thereby ensuring communication quality of the terminal side device after successful access.

In a possible design, the terminal side device sends a second message to the network side device based on a second random access response, where the second message indicates to cancel random access corresponding to the second random access response, and the second random access response is any one of M−1 random access responses other than the first random access response in the M random access responses.

Based on the foregoing method, the terminal side device may notify the network side device of an uplink BWP on which the terminal side device does not perform random access, to be specific, the terminal side device does not perform random access on an uplink BWP used to send a random access preamble to which the second random access response responds. In this way, after receiving the second message on a specific uplink BWP, the network side device cancels random access on the uplink BWP, that is, the network side device does not need to schedule an uplink resource again. Therefore, an uplink resource waste can be avoided, and an uplink capacity of a cell can be reduced.

In a possible design, the terminal side device receives M random access responses sent by the network side device, and sends a first message to the network side device based on a $k^{th}$ random access response in the M random access responses, where M is a positive integer less than or equal to N, the first message requests contention conflict resolution for random access corresponding to the $k^{th}$ random access response, and k is any integer from 1 to M.

Based on the foregoing method, the terminal side device can notify the network side device of an uplink BWP on which the terminal side device chooses to perform random access.

According to a second aspect, this application provides a communication method, and the method includes a network side device receives a random access preamble on each of P uplink BWPs from a terminal side device, and sends P random access responses to the terminal side device based on received P random access preambles, and the network side device receives a first message in response to a first random access response from the terminal side device, where the P uplink BWPs are included in N uplink BWPs, N is an integer greater than or equal to 2, P is a positive integer less than or equal to N, the first random access response is one of the P random access responses, and the first message requests contention conflict resolution for random access corresponding to the first random access response.

Based on the foregoing method, any terminal side device can select, in a random access process, an appropriate uplink BWP from the N BWPs by selecting the first random access response, and due to uncertainty of an actual scenario, a probability that different terminal side devices select a same first random access response is relatively low, that is, a probability that different terminal side devices choose to perform random access on a same uplink BWP is relatively low. In this way, a phenomenon that a contention conflict occurs between each terminal side device and another terminal side device in a random access process can be reduced such that a success probability of random access of each terminal side device can be improved.

In a possible design, the network side device receives a second message in response to a second random access response from the terminal side device, where the second random access response is any one of P−1 random access responses other than the first random access response in the P random access responses, and the second message indicates to cancel random access corresponding to the second random access response.

Based on the foregoing method, after receiving the second message on a specific uplink BWP, the network side device cancels random access on the uplink BWP, that is, the network side device does not need to schedule an uplink resource again. Therefore, an uplink resource waste can be avoided, and an uplink capacity of a cell can be reduced.

According to a third aspect, this application provides a communication method, and the method includes a network side device receives a random access preamble on each of P uplink BWPs from a terminal side device, and sends P random access responses to the terminal side device based on received P random access preambles, and the network side device receives L first messages in response to L random access responses from the terminal side device, selects a target first message from the L first messages, and sends a contention conflict resolution message based on the target first message, where the P uplink BWPs are included in N uplink BWPs, N is an integer greater than or equal to 2, P is a positive integer less than or equal to N, the L random access responses are included in the P random access responses, L is a positive integer less than or equal to P, a first message in response to a $k^{th}$ random access response requests contention conflict resolution for random access corresponding to the $k^{th}$ random access response, k is any integer from 1 to P, and the contention conflict resolution message indicates contention conflict resolution for random access corresponding to a random access response to which the target first message responds.

Based on the foregoing method, any terminal side device can select, in a random access process, an appropriate uplink BWP from the N BWPs to perform random access, and due to uncertainty of an actual scenario, a probability that the network side device chooses to perform random access on a same uplink BWP for different terminal side devices is relatively low. In this way, a phenomenon that a contention conflict occurs between each terminal side device and another terminal side device in a random access process can be reduced such that a success probability of random access of each terminal side device can be improved.

In a possible design, the network side device may select, based on a load status in a cell, the target first message from the L first messages that are from the terminal side device that the network side device may determine L uplink BWPs used by the terminal side device to send the L first messages, and determine a target uplink BWP with minimum load in the L uplink BWPs, and the network side device uses, as the target first message, a first message in the L first messages that is sent on the target uplink BWP.

Based on this method, the network side device may select the target uplink BWP for the terminal side device based on a load status of an uplink BWP in the cell, thereby implementing load balancing between uplink BWPs in the cell.

In another possible design, the network side device may alternatively select, in the following manners, the target first message from the L first messages that are from the terminal side device: Manner 1: The network side device selects, as the target first message, the first message received within a preset third time window. Manner 2: The network side device selects a first message of best signal quality within a preset fourth time window as the target first message. Manner 3: The network side device randomly selects one of the L first messages as the target first message.

In the manner 1, the network side device can respond to a fastest first message such that the network side device can enable the terminal side device to perform random access on an uplink BWP with a fastest response speed, thereby reducing a delay of resolving a contention conflict by the terminal side device, and enabling the terminal side device to access, as quickly as possible, a cell managed by a network side. In the manner 2, the network side device can respond to the first message of the best signal quality. In this way, the network side device can enable the terminal side device to perform random access on an uplink BWP of best channel quality, thereby ensuring communication quality of the terminal side device after successful access.

According to a fourth aspect, this application provides a terminal side device, and the terminal side device has a function of implementing the terminal side device in the method in the first aspect. The function may be implemented using hardware, or may be implemented by executing corresponding software by hardware. The hardware or software includes one or more modules corresponding to the foregoing function.

In a possible design, a structure of the terminal side device includes a processing unit and a sending unit, and the units may perform corresponding functions in the foregoing method example. For details, refer to detailed descriptions in the method example. The details are not described herein.

In a possible design, a structure of the terminal side device includes a transceiver and a processor, and optionally, may further include a memory. The transceiver is configured to receive and transmit data and communicate and interact with another device in a mobile communications system, and the processor is configured to support the terminal side device in performing corresponding functions in any method in the first aspect. The memory is coupled to the processor, and stores a program instruction and data that are necessary for the terminal side device.

According to a fifth aspect, this application provides a network side device, and the network side device has a function of implementing the network side device in the method in the second aspect. The function may be implemented using hardware, or may be implemented by executing corresponding software by hardware. The hardware or software includes one or more modules corresponding to the foregoing function.

In a possible design, a structure of the network side device includes a receiving unit and a sending unit, and the units may perform corresponding functions in the foregoing method example. For details, refer to detailed descriptions in the method example. The details are not described herein.

In a possible design, a structure of the network side device includes a transceiver and a processor, and optionally, may further include a memory. The transceiver is configured to receive and transmit data and communicate and interact with another device in a mobile communications system, and the processor is configured to support the network side device in performing corresponding functions in any method in the second aspect. The memory is coupled to the processor, and stores a program instruction and data that are necessary for the network side device.

According to a sixth aspect, this application provides a network side device, and the network side device has a function of implementing the network side device in the method in the third aspect. The function may be implemented using hardware, or may be implemented by executing corresponding software by hardware. The hardware or software includes one or more modules corresponding to the foregoing function.

In a possible design, a structure of the network side device includes a receiving unit, a sending unit, and a processing unit, and the units may perform corresponding functions in the foregoing method example. For details, refer to detailed descriptions in the method example. The details are not described herein.

In a possible design, a structure of the network side device includes a transceiver and a processor, and optionally, may further include a memory. The transceiver is configured to receive and transmit data and communicate and interact with another device in a mobile communications system, and the processor is configured to support the network side device in performing corresponding functions in any method in the third aspect. The memory is coupled to the processor, and stores a program instruction and data that are necessary for the network side device.

According to a seventh aspect, an embodiment of this application further provides a computer storage medium. The computer storage medium stores a computer executable instruction, and when the computer executable instruction is invoked by a computer, the computer is enabled to perform the method mentioned in any possible design in the first to the third aspects.

In an eighth aspect, an embodiment of this application further provides a computer program product including an instruction. When the computer program product runs on an electronic device, the electronic device is enabled to perform the method mentioned in any possible design in the first to the third aspects.

According to a ninth aspect, an embodiment of this application further provides an electronic device. The electronic device may be a chip, and the chip is connected to a memory, and is configured to read and execute a program instruction stored in the memory, to implement the method mentioned in any possible design in the first to the third aspects.

DESCRIPTION OF EMBODIMENTS

Figure 1:
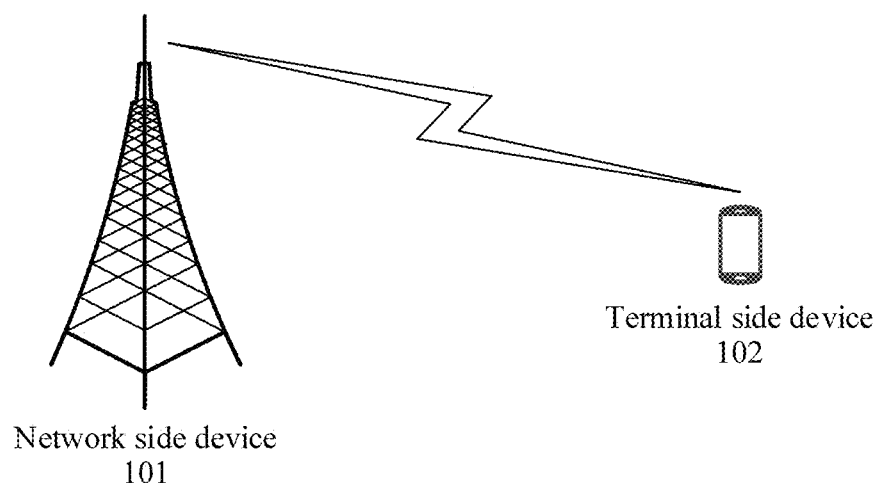
FIG. 1 is an architectural diagram of a mobile communications system according to an embodiment of this application.

This application provides a communication method and a device, to reduce a probability of a random access failure caused when a contention conflict occurs in a random access process of a terminal side device in a mobile communications system. The method and the device are based on a same concept. Because the method and the device have similar problem resolving principles, for implementation of the device and implementation of the method, refer to each other. Repeated parts are not described.

In the following, some terms in this application are described, to help persons skilled in the art have a better understanding.

(1). A terminal side device is a device that provides a voice and/or data connectivity for a user. Optionally, the terminal side device in this application may be a terminal device, or a hardware component that is inside the terminal device and that is capable of implementing functions of the terminal device.

The terminal device may also be referred to as user equipment (UE), a mobile station (MS), a mobile terminal (MT), or the like. For example, the terminal device may be a handheld device or an in-vehicle device having a wireless connection function.

Some examples of the terminal device are a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self-driving, a wireless terminal in a remote medical surgery, a wireless terminal in a smart grid, a wireless terminal in transportation safety, a wireless terminal in a smart city, a wireless terminal in a smart home, and the like.

The hardware component that is inside the terminal device and that is capable of implementing the functions of the terminal device may be a processor and/or a programmable chip inside the terminal device. Optionally, the chip may be implemented by an application-specific integrated circuit (ASIC) or a programmable logic device (PLD). The PLD may be any one of a complex PLD (CPLD), a field-programmable gate array (FPGA), generic array logic (GAL), and a system on a chip (SOC), or any combination thereof.

(2). A network side device is a device that is in a mobile communications system and that connects the terminal side device to a wireless network. Optionally, the network side device in this application may be a network device, or a hardware component that is inside the network device and that is capable of implementing functions of the network device.

The network device may be a node in a radio access network, and may also be referred to as a base station, or may be referred to as a radio access network (RAN) node (or device). Some examples of the network device are a gNB, a transmission reception point (TRP), an evolved NodeB (eNB), a radio network controller (RNC), a NodeB (NB), a base station controller (BSC), a base transceiver station (BTS), a home base station (for example, home eNB, or home NodeB (HNB)), or a baseband unit (BBU), and the like. In addition, in a network structure, the network device may include a centralized unit (CU) node and a distributed unit (DU) node. This structure separates protocol layers of an eNB in a Long-Term Evolution (LTE) system. Functions of some protocol layers (for example, a Packet Data Convergence Protocol (PDCP) layer and a Radio Resource Control (RRC) layer) are centrally controlled by a CU, functions of some or all of remaining protocol layers (for example, a physical (PHY) layer, a media access control (MAC) layer, and a radio link control (RLC) layer) are distributed in a DU, and the DU is controlled by the CU.

The hardware component that is inside the network device and that is capable of implementing the functions of the network device may be a processor and/or a programmable chip inside the network device. Optionally, the chip may be implemented by an ASIC or a PLD. The PLD may be any one of a CPLD, an FPGA, GAL, and a SOC or any combination thereof.

(3). A BWP is a segment of consecutive frequency resources on a carrier used by a cell managed by the network side device. For example, one BWP may include K consecutive subcarriers, or include a frequency resource on which M consecutive and non-overlapping resource blocks (RB) are located, or include a frequency resource on which N consecutive and non-overlapping resource block groups (RBG) are located. K, M, and N are integers greater than 0. The BWP may also be referred to as a bandwidth resource, a bandwidth region, a frequency domain resource, a frequency resource part, a partial frequency resource, or another name. This is not limited in this application.

(4). The term "and/or" describes an association relationship for describing associated objects and represents that three relationships may exist. For example, A and/or B may represent the following three cases: only A exists, both A and B exist, and only B exists. The character "/" generally indicates an "or" relationship between the associated objects.

In this application, "a plurality of" means two or more than two.

In addition, it should be understood that in the descriptions of this application, words such as "first" and "second" are merely used for distinguished descriptions, and cannot be understood as an indication or implication of relative importance, and cannot be understood as an indication or implication of a sequence.

The following further illustrates the embodiments of this application in detail with reference to accompanying drawings of this specification.

FIG. 1 shows an architecture of a possible mobile communications system to which a communication method provided in an embodiment of this application is applicable. As shown in FIG. 1, the mobile communications system includes a network side device 101 and a terminal side device 102.

The network side device 101 is responsible for providing a wireless access-related service for the terminal side device 102, and implementing a physical layer function, resource scheduling and radio resource management, quality of service (QoS) management, radio access control, and a mobility management function.

The terminal side device 102 is a device that accesses a network using the network side device 101.

The network side device 101 and the terminal side device 102 are connected using an air interface (for example, Uu) interface, thereby implementing communication between the terminal side device 102 and the network side device 101.

In the mobile communications system, bandwidth capabilities of the network side device 101 and the terminal side device 102 may be different. A bandwidth capability of any device (the network side device 101 or the terminal side device 102) is a capability of maximum transmission bandwidth that can be supported by the device, and may be represented by maximum bandwidth of the device. Generally, maximum bandwidth of the terminal side device 102 is affected by various factors such as a service requirement and manufacturing costs of the terminal side device 102.

The maximum bandwidth of the network side device 101 and maximum bandwidth of each terminal side device 102 in the mobile communications system are different. Therefore, a concept of BWP is introduced into the mobile communications system, and a carrier used by a cell managed by the network side device 101 is divided into a plurality of BWPs. Optionally, a rule for obtaining the BWP through division may be defined by the network side device 101 based on an actual application requirement, or may be stipulated in a protocol in advance.

Before the terminal side device 102 accesses the network side device 101, the network side device 101 broadcasts a system message in the managed cell. The system message includes random access configuration information of the cell. The random access configuration information may be one or any combination of the following: an uplink BWP used by the terminal side device 102 to perform random access, at least one random access preamble (for example, belonging to a specific random access preamble resource pool) on the uplink BWP, and a frequency resource and a time resource corresponding to the uplink BWP.

After entering a coverage area of the cell, the terminal side device 102 receives the system message from the network side device 101, and initiates a random access process based on the random access configuration information included in the system message, to request to access the cell.

After successfully accessing the cell, the terminal side device 102 reports a bandwidth capability of the terminal side device 102 to the network side device 101. For example, the terminal side device 102 transmits the maximum bandwidth of the terminal side device 102 to the network side device 101. The network side device 101 configures an uplink BWP and a downlink BWP for the terminal side device 102 in the plurality of BWPs based on the maximum bandwidth of the terminal side device 102. Subsequently, the terminal side device 102 and the network side device 101 may communicate with each other based on the uplink BWP and the downlink BWP.

It should be noted that the communications system shown in FIG. 1 does not limit the communications system to which the communication method provided in this embodiment of this application is applicable. Optionally, the communications system may be a 5G mobile communications system (for example, an NR system), another evolved mobile communications system based on the 5G mobile communications system, or the like. This is not limited in this embodiment of this application.

Figure 2:
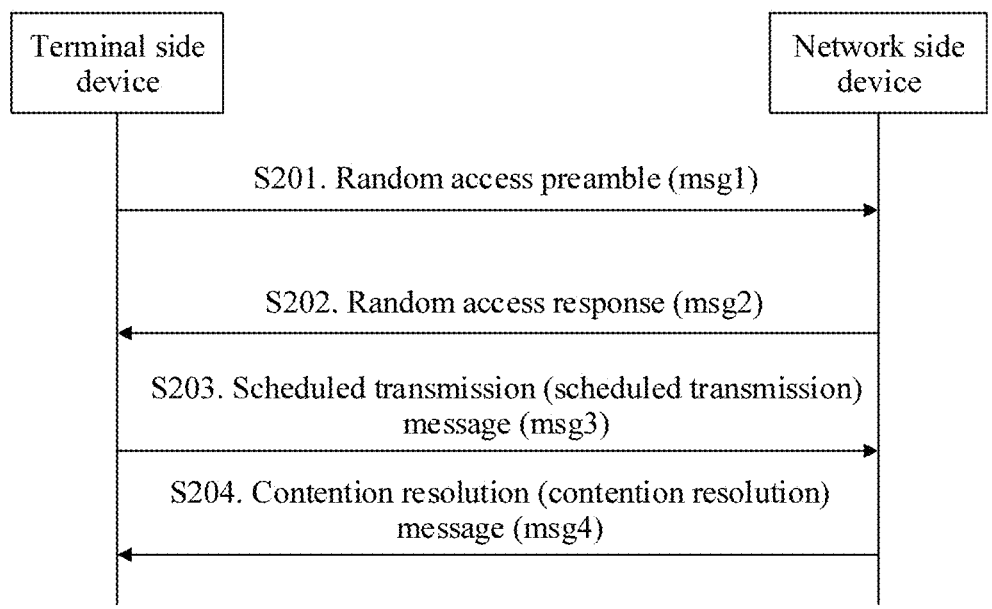
FIG. 2 is a flowchart of a random access process according to an embodiment of this application.

In the mobile communications system shown in FIG. 1, the terminal side device usually uses a contention-based random access process to request to access the cell. As shown in FIG. 2, a current contention-based random access process includes the following steps.

S201: Within a coverage area of a cell managed by a network side device, after a terminal side device finds the cell through network searching, the terminal side device receives a system message broadcast by the network side device, to obtain random access configuration information of the cell that is included in the system message. Then, the terminal side device determines, based on the random access configuration information of the cell, a random access preamble on an uplink BWP and a frequency resource and a time resource corresponding to the uplink BWP, and then sends the random access preamble (referred to as a message 1 (msg1)) on the uplink BWP to the network side device using the frequency resource and the time resource corresponding to the uplink BWP, to notify the network side device of existence of the terminal side device that requests random access.

After sending the random access preamble, the terminal side device starts a random access response (RAR) time window, and monitors, within the RAR time window, an RAR sent by the network side device. If the terminal side device does not receive the RAR within the RAR time window, it is determined that current random access fails.

S202: After receiving the random access preamble sent by the terminal side device, the network side device sends an RAR (referred to as a message 2 (msg2)) to the terminal side device.

In the contention-based random access process, each terminal side device selects a random access preamble from a common random access preamble resource pool. The random access preamble resource pool may be stipulated in a protocol or included in the system message broadcast by the network side device. Therefore, there may be the following random access contention conflict phenomena in the mobile communications system.

At a same moment, a plurality of terminal side devices perform step S201, and select a same random access preamble to request random access to the cell. Therefore, in step S202, the network side device cannot determine an exact terminal side device that the received random access preamble is from. In this case, to enable the network side device to identify an identity of each terminal side device, each terminal side device notifies the network side device of the identity of the terminal side device using S203 after receiving the RAR.

S203: After receiving the RAR within the RAR time window, the terminal side device sends, to the network side device, a scheduled transmission message (also referred to as a message 3 (msg3)) that carries an identifier of the terminal side device, to implement initial uplink transmission of the terminal side device, to request the network side device to resolve a contention conflict for the random access of the terminal side device.

The identifier of the terminal side device may be an identifier allocated by a core network device to the terminal side device, for example, a cell radio network temporary identifier (C-RNTI) or a UE identifier (ID).

Optionally, the scheduled transmission message may further carry an RRC connection request.

S204: After receiving a scheduled transmission message sent by at least one terminal side device, the network side device sends a contention resolution message (or a message 4 (msg4)) to one terminal side device, where the contention resolution message carries an identifier of the terminal side device. The terminal side device is a terminal side device that is designated by the network side device and that wins in a random access contention conflict. That is, the network side device resolves a contention conflict for random access of the terminal side device.

If a terminal side device receives a contention resolution message that carries an identifier of the terminal side device, it indicates that current random access of the terminal side device succeeds. If the terminal side device does not receive the contention resolution message that carries the identifier of the terminal side device, it indicates that the current random access fails, and a new random access process may be re-initiated.

Optionally, when the scheduled transmission message carries an RRC connection request, the contention resolution message further carries configuration information used for establishing an RRC connection. In this way, after the random access succeeds, the terminal side device may establish the RRC connection based on the configuration information used for establishing the RRC connection, to implement data communication with the network side device.

In the foregoing mobile communications system, a cell is usually designated as a common uplink BWP used by the terminal side device to perform random access. Therefore, within a coverage area of the cell, a plurality of terminal side devices receive same system information. In this case, the plurality of terminal side devices may select a same random access preamble from a common random access preamble resource pool, and send the random access preamble using a same time resource. It can be learned from the foregoing descriptions of the random access process that, in this case, there is a relatively high probability that the foregoing contention conflict occurs in a random access process of each terminal side device. Consequently, random access of the terminal side device fails, and a delay of accessing the cell by the terminal side device increases.

Figure 3:
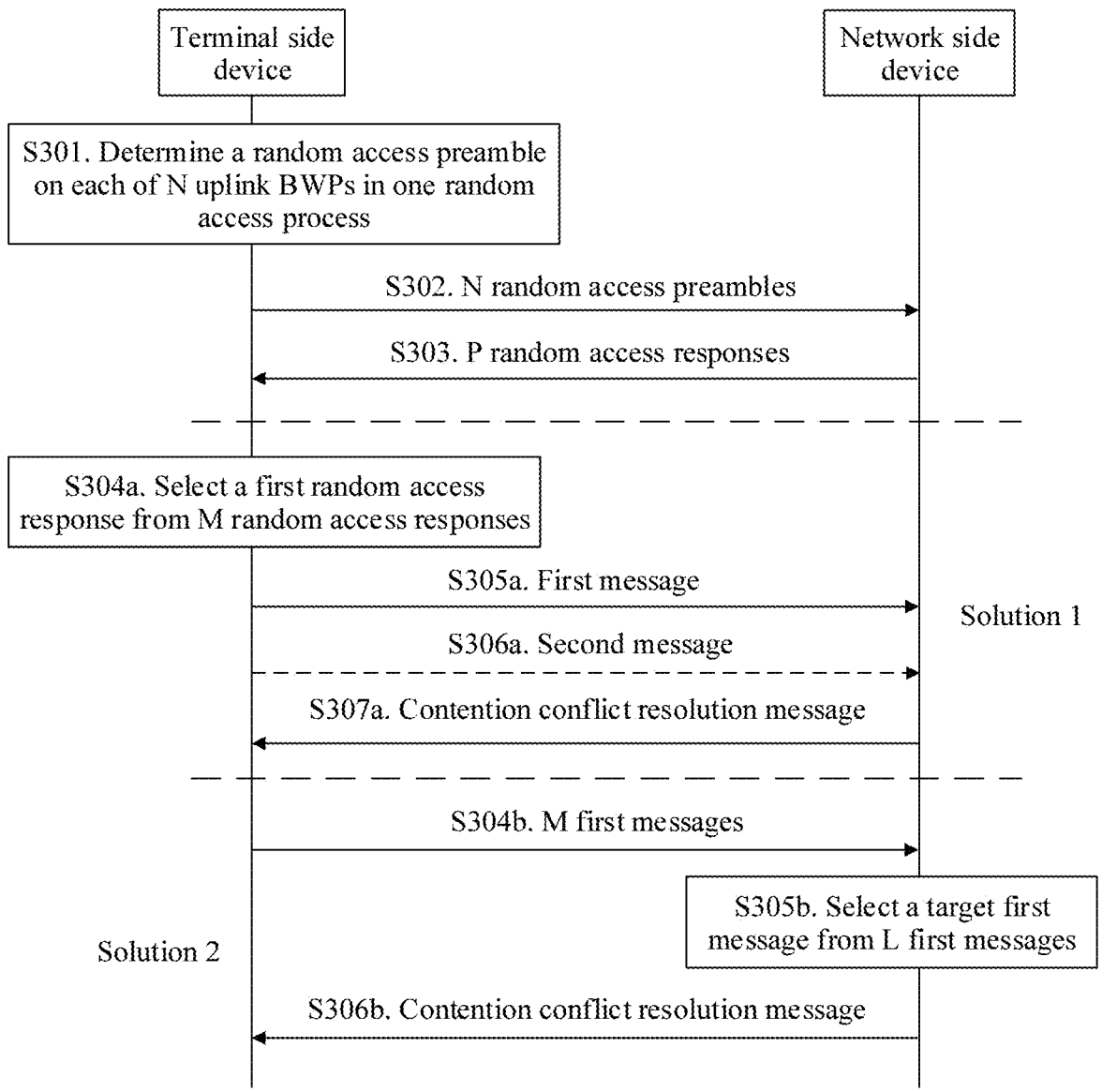
FIG. 3 is a flowchart of a communication method according to an embodiment of this application.

To resolve a problem of a contention failure of the terminal side device in the random access process, an embodiment of this application provides a communication method. The method is applicable to the mobile communications system shown in FIG. 1. As shown in FIG. 3, a procedure of the method includes the following steps.

S301: A terminal side device determines a random access preamble on each of N uplink BWPs in one random access process, where N is an integer greater than or equal to 2.

In this embodiment of this application, the terminal side device may trigger execution of a contention-based random access process in the following scenarios or other scenarios:

Scenario 1: The terminal side device initially accesses a cell after entering a coverage area of the cell managed by a network side device, for example, a process in which the terminal side device performs random access to the network side device from being powered on.

Scenario 2: The terminal side device needs to re-establish an RRC connection. For example, a radio link failure occurs between the terminal side device and the network side device, and the RRC connection is re-established through random access.

Scenario 3: The terminal side device performs serving cell handover (HO), for example, hands over from a source cell to a target cell. The source cell and the target cell may belong to a same network side device, or may belong to different network side devices.

Scenario 4: The terminal side device is in an RRC connected mode but is out of uplink synchronization with the network side device, and completes uplink synchronization through random access when downlink data arrives or uplink data arrives such that the terminal side device feeds back the downlink data or transmits the uplink data.

It should be noted that, in this embodiment of this application, one random access process of the terminal side device includes N times of random access, that is, each of the N uplink BWPs corresponds to one time of random access. A random access preamble on any uplink BWP is a random access preamble used for random access corresponding to the uplink BWP, and is also a random access preamble that needs to be sent by the terminal side device on the uplink BWP (using a frequency resource on the uplink BWP).

In an implementation, the terminal side device may perform S301 using the following step.

The terminal side device determines the random access preamble on each uplink BWP from at least one random access preamble (which may belong to a same random access preamble resource pool).

The random access preamble resource pool may be stipulated in a protocol in advance, or may be obtained by the terminal side device from random access configuration information. The terminal side device obtains the random access configuration information by receiving a system message broadcast by the network side device.

It should be further noted that a quantity of random access preamble resource pools is not limited in this embodiment of this application. Optionally, there may be one random access preamble resource pool, that is, the random access preamble resource pool is commonly set for the N uplink BWPs, or there are N random access preamble resource pools, that is, each random access preamble resource pool is set for one uplink BWP, or the quantity of random access preamble resource pools is less than N, some random access preamble resource pools are separately commonly set for two or more uplink BWPs, and each random access preamble in the other random access preamble resource pools is set for one uplink BWP.

In addition, when there is a plurality of random access preamble resource pools, random access preambles in any two random access preamble resource pools may be entirely different, or may be entirely the same, or may be partially the same and partially different. This is not limited in this application.

It can be learned from the foregoing descriptions of the random access preamble resource pool that the random access preamble that is on each uplink BWP and that is determined by the terminal side device using step S301 may meet any one of the following three cases:

Case 1: Random access preambles that are on all the uplink BWPs and that are determined by the terminal side device are different.

Case 2: Random access preambles that are on all the uplink BWPs and that are determined by the terminal side device are the same.

Case 3: Random access preambles that are on at least two uplink BWPs and that are determined by the terminal side device are the same.

It should be noted that the N uplink BWPs are uplink BWPs used for random access in the mobile communications system. Optionally, the N uplink BWPs may be stipulated in the protocol in advance, or may be obtained by the terminal side device from the random access configuration information. This is not limited in this application.

Optionally, in the mobile communications system, for different types of terminal side devices or terminal side devices that request different services, quantities of uplink BWPs used for random access may be different. For example, when the terminal side device requests a low-latency and high-reliability service, N=3, and when the terminal side device requests a service that has a common latency and a relatively low reliability requirement, N=2.

S302: The terminal side device sends the random access preamble on each uplink BWP to the network side device, and the network side device receives a random access preamble on each of P uplink BWPs from the terminal side device.

In an actual application scenario, the network side device may receive random access preambles on the N uplink BWPs, or may receive random access preambles on some of the N uplink BWPs. Therefore, in the foregoing step, the P uplink BWPs are included in the N uplink BWPs, and P is a positive integer less than or equal to N.

In an implementation, the terminal side device may perform S302 using the following steps:

A. The terminal side device determines a frequency resource and a time resource corresponding to each uplink BWP.

B. The terminal side device sends the random access preamble on each uplink BWP to the network side device using the frequency resource and the time resource corresponding to each uplink BWP.

A frequency domain resource and the time resource corresponding to each uplink BWP may be a frequency resource and a time resource that are used when the terminal side device sends the random access preamble on the uplink BWP. Optionally, when performing step A, the terminal side device may determine, using the following method, a frequency resource and a time resource corresponding to any uplink BWP.

The terminal side device obtains at least one frequency resource and at least one time resource that are set for the uplink BWP.

Then, the terminal side device selects, from the at least one frequency domain resource and the at least one time resource that are set for the uplink BWP, a frequency resource and a time resource (that is, the frequency resource and the time resource corresponding to the uplink BWP) that are used to send a random access preamble on the uplink BWP.

Optionally, in the foregoing method, the at least one frequency resource and the at least one time resource that are set for the uplink BWP may be stipulated in the protocol in advance, or may be obtained by the terminal side device from the random access configuration information.

In an implementation, when a quantity of frequency resources and/or time resources that are set for the uplink BWP is the same as a quantity of random access preambles included in a random access preamble resource pool used to determine the random access preamble on the uplink BWP, and the frequency resources and/or the time resources are in a one-to-one correspondence with the random access preambles included in the random access preamble resource pool, the terminal side device may select, based on the random access preamble on the uplink BWP determined in S301 and from the plurality of frequency domain resources and/or the plurality of time resources that are set for the uplink BWP, the frequency resource and the time resource that are used to send the random access preamble on the uplink BWP.

It should be noted that, because a frequency resource included in each uplink BWP is different, frequency resources corresponding to different uplink BWPs are different. However, time resources corresponding to different uplink BWPs may overlap (including partial overlapping and full overlapping) or not overlap. This is not limited in this embodiment of this application.

S303: The network side device sends P random access responses to the terminal side device based on received P random access preambles, and the terminal side device receives M random access responses sent by the network side device.

Corresponding to receiving of the random access preamble by the network side device, the terminal side device may send random access preambles on P uplink BWPs, or may send random access preambles on some of P uplink BWPs. Therefore, in the foregoing step, the M uplink BWPs are included in the P uplink BWPs, and M is a positive integer less than or equal to P.

In S303, the network side device may send the random access response to the terminal side device based on each received random access preamble. A specific process is not described herein.

It should be noted that the network side device may respectively send the P random access responses through P channels. Optionally, the P channels may separately belong to different downlink BWPs, or belong to a same downlink BWP.

Each of the P random access responses is used to respond to one random access preamble sent by the network side device. Optionally, after receiving a random access response, the terminal side device may determine, based on the random access response, a random access preamble to which the random access response responds. Optionally, the terminal side device may determine, based on either of or a combination of a channel (for example, a physical downlink shared channel (PDSCH)) for sending the random access response, and identification information (an uplink BWP, sequence information, a frequency resource and/or a time resource used for sending the random access preamble, and the like) that is of the random access preamble and that is included in the random access response, the random access preamble to which the random access response responds.

Based on the foregoing steps, any terminal side device in the mobile communications system can send random access preambles on N uplink BWPs to the network side device in one random access process such that the terminal side device can perform random access on a plurality of uplink BWPs, thereby increasing a random access opportunity of the terminal side device. In this method, because the network side device or each terminal side device may subsequently perform random access on any one of the N uplink BWPs, this method can reduce a phenomenon that a contention conflict occurs between each terminal side device and another terminal side device in a random access process, thereby improving a success probability of random access of each terminal side device.

In this embodiment of this application, a plurality of solutions may be used in the mobile communications system after S303 such that the network side device or each terminal side device performs random access on any one of the N uplink BWPs. Only a solution 1 and a solution 2 are used as examples for description below. As shown in FIG. 3, the solution 1 is implemented using steps S304a to S307a, and the solution 2 is implemented using steps S304b to S306b.

Solution 1:

S304a: The terminal side device selects a first random access response from the M random access responses.

Optionally, the first random access response may be selected by the terminal side device in the following manners.

Manner 1: The terminal side device selects, as the first random access response, the first random access response received in a preset first time window.

The first time window is stipulated in the protocol or is determined by the terminal side device based on an actual application. This is not limited in this application.

In the foregoing manner 1, optionally, the terminal side device may respond, using a subsequent step, to the fastest first random access response. In this way, it can be ensured that the terminal side device performs random access on an uplink BWP with a fastest response speed, and a delay of resolving a contention conflict corresponding to the first random access response by the terminal side device can be reduced such that the terminal side device can access, as quickly as possible, a cell managed by a network side.

Manner 2: The terminal side device selects, as the first random access response, a random access response of best signal quality within a preset second time window.

The second time window is stipulated in the protocol or is determined by the terminal side device based on an actual application. This is not limited in this application.

When the terminal side device selects the first random access response in the manner 2, the terminal side device may sort signal quality of the M random access responses.

The signal quality may be represented using a plurality of indicators of a channel that carries a signal, for example, signal quality of a reference signal on the channel, receive power of the channel, and a signal-to-noise ratio (SNR) of the channel. Therefore, in the manner 2, the terminal side device may sort the signal quality of the random access responses using a plurality of methods.

For example, the terminal side device may sort signal quality of reference signals on channels that carry the M random access responses, to determine a sequence of the signal quality of the M random access responses. Higher signal quality of a reference signal on a channel indicates higher signal quality of a random access response carried on the channel.

For another example, the terminal side device may determine receive power of channels that carry the M random access responses, and then sort the receive power of the channels that carry the M random access responses, to determine a sequence of the signal quality of the M random access responses. Smaller receive power of a channel that carries the random access response indicates higher signal quality of the random access response carried on the channel.

For still another example, the terminal side device determines signal-to-noise ratios of channels that carry the M random access responses, and then sorts the signal-to-noise ratios of the channels that carry the M random access responses, to determine a sequence of the signal quality of the M random access responses. A larger signal-to-noise ratio of a channel that carries the random access response indicates higher signal quality of the random access response carried on the channel.

In the foregoing manner 2, the terminal side device may respond to the first random access response of the best signal quality using a subsequent step. In this way, it can be ensured that the terminal side device performs random access on an uplink BWP of best channel quality, thereby ensuring communication quality of the terminal side device after successful access.

Manner 3: The terminal side device randomly selects a random access response from the M random access responses as the first random access response.

S305a: The terminal side device sends a first message to the network side device based on the first random access response, where the first message requests contention conflict resolution for random access corresponding to the first random access response, and the network side device receives the first message in response to the first random access response from the terminal side device.

The terminal side device may send the first message on the uplink BWP used to send the random access preamble to which the first random access response responds. Optionally, the first message may be the foregoing msg3, and the first message includes an identifier of the terminal side device, for example, a C-RNTI or a UE ID.

In an implementation, the terminal side device only needs to respond to the first random access response using S304a and S305a, to notify the network side device of an uplink BWP on which the terminal side device chooses to perform random access, to be specific, the terminal side device chooses to perform random access on the uplink BWP used to send the random access preamble to which the first random access response responds. Therefore, the first message may also be referred to as a RAR acknowledgement (RAR-ACK).

Optionally, in another implementation, the terminal side device not only responds to the first random access response, but also responds to other M−1 random access responses using S306a.

S306a: The terminal side device sends a second message to the network side device based on a second random access response, where the second message indicates to cancel random access corresponding to the second random access response, and the second random access response is any one of M−1 random access responses other than the first random access response in the M random access responses, and the network side device receives the second message in response to the second random access response from the terminal side device.

The terminal side device may send the second message on an uplink BWP used to send a random access preamble to which the second random access response responds.

Optionally, the second message may also be msg3, and the second message includes the identifier of the terminal side device, for example, the C-RNTI or the UE ID.

In S306a, the terminal side device responds to the second random access response, to notify the network side device of an uplink BWP on which the terminal side device does not perform random access, to be specific, the terminal side device does not perform random access on the uplink BWP used to send the random access preamble to which the second random access response responds. In this way, after receiving the second message on a specific uplink BWP, the network side device cancels random access on the uplink BWP.

In this implementation, the second message may also be referred to as a RAR negative acknowledgement (RAR-NACK).

In a conventional contention-based random access process, if the network side device does not receive msg3 in response to a random access response after sending the random access response, an uplink resource is rescheduled such that the terminal side device sends the msg3. Using the foregoing step, after receiving the second message on a specific uplink BWP, the network side device cancels random access on the uplink BWP, that is, the network side device does not need to schedule the uplink resource again. Therefore, an uplink resource waste can be avoided, and an uplink capacity of a cell can be reduced.

S307a: The network side device sends a contention conflict resolution message based on the received first message, where the contention conflict resolution message indicates contention conflict resolution for random access corresponding to the random access response to which the first message responds, and the terminal side device receives the contention conflict resolution message from the network side device.

Optionally, the contention conflict resolution message may be msg4, and the contention conflict resolution message includes the identifier of the terminal side device that is included in the first message.

In S307a, the terminal side device can successfully complete random access on a target BWP such that data communication with the network side device can be implemented after the RRC connection is established. The target BWP is an uplink BWP used by the terminal side device to send the random access preamble to which the first random access response responds.

Based on the foregoing solution 1, any terminal side device can select, in a random access process, an appropriate uplink BWP from the N BWPs by selecting the first random access response, and due to uncertainty of an actual scenario, a probability that different terminal side devices select a same first random access response is relatively low, that is, a probability that different terminal side devices choose to perform random access on a same uplink BWP is relatively low. In this way, in this solution, a phenomenon that a contention conflict occurs between each terminal side device and another terminal side device in a random access process can be reduced such that a success probability of random access of each terminal side device can be improved.

Solution 2:

S304b: The terminal side device sends a first message to the network side device based on a $k^{th}$ random access response in the M random access responses, where the first message requests contention conflict resolution for random access corresponding to the $k^{th}$ random access response, and k is any integer from 1 to M, and the network side device receives L first messages in response to L random access responses from the terminal side device.

Similarly, to receiving of the random access preamble by the network side device, a quantity of first messages received by the network side device is less than or equal to a quantity of first messages sent by the terminal side device, that is, the L random access responses are included in the M random access responses, and L is a positive integer less than or equal to M.

In the solution 2, that the terminal side device sends the first message to the network side device based on the $k^{th}$ random access response is the same as that the terminal side device sends the first message to the network side device based on the first random access response in the solution 1, and functions of the first message in the two solutions are also the same. Therefore, refer to the descriptions of S305a in the solution 1. Details are not described herein.

When sending the first message based on any random access response, the terminal side device sends the first message on an uplink BWP used to send a random access preamble to which the random access response responds.

S305b: The network side device selects a target first message from the L first messages.

The network side device may simultaneously receive first messages from a plurality of terminal side devices. Therefore, the network side device may determine, using an identifier of a terminal side device that is included in each first message, first messages that are from a same terminal side device. Then, the network side device selects the target first message from the first messages that are from the same terminal side device.

The network side device selects the target first message, and selects a target uplink BWP for the terminal side device to perform random access. The target uplink BWP is a BWP used by the terminal side device to send the target first message.

Optionally, the network side device may select, based on a load status in a cell, the target first message from the L first messages that are from the terminal side device.

The network side device may determine L uplink BWPs used by the terminal side device to send the L first messages.

The network side device determines a target uplink BWP with minimum load in the L uplink BWPs.

The network side device uses, as the target first message, a first message in the L first messages that is sent on the target uplink BWP.

Based on this method, the network side device may select the target uplink BWP for the terminal side device based on a load status of an uplink BWP in the cell, thereby implementing load balancing between uplink BWPs in the cell.

In addition, optionally, similar to that the terminal side device selects the first random access response from the M random access responses in the solution 1, the network side device may further select, in the following several manners, the target first message from the L first messages that are from the terminal side device.

Manner 1: The network side device selects, as the target first message, the first message received within a preset third time window.

In the manner 1, the network side device can respond to a fastest first message such that the network side device can enable the terminal side device to perform random access on an uplink BWP with a fastest response speed, thereby reducing a delay of resolving a contention conflict by the terminal side device, and enabling the terminal side device to access, as quickly as possible, a cell managed by a network side.

Manner 2: The network side device selects a first message of best signal quality within a preset fourth time window as the target first message.

For selecting the first message of the best signal quality from the L first messages by the network side device, refer to a specific method used by the terminal side device to select the random access response of the best signal quality from the M random access responses. Details are not described herein.

In the foregoing manner 2, the network side device may respond to the first message of the best signal quality. In this way, the network side device can enable the terminal side device to perform random access on an uplink BWP of best channel quality, thereby ensuring communication quality of the terminal side device after successful access.

Manner 3: The network side device randomly selects a first message from the L first messages as the target first message.

S306b: The network side device sends a contention conflict resolution message based on the target first message, where the contention conflict resolution message indicates completion of contention conflict resolution for random access corresponding to a random access response (that is, a target random access response) to which the target first message responds, and the terminal side device receives the contention conflict resolution message from the network side device.

In S306b, the terminal side device can successfully complete random access on a target BWP such that data communication with the network side device can be implemented after the RRC connection is established. The target BWP is an uplink BWP used by the terminal side device to send the random access preamble to which the target random access response responds.

Based on the foregoing solution 2, any terminal side device can select, in a random access process, an appropriate uplink BWP from the N BWPs to perform random access, and due to uncertainty of an actual scenario, a probability that the network side device chooses to perform random access on a same uplink BWP for different terminal side devices is relatively low. In this way, in this solution, a phenomenon that a contention conflict occurs between each terminal side device and another terminal side device in a random access process can be reduced such that a success probability of random access of each terminal side device can be improved.

It should be noted that, in the embodiment shown in FIG. 3, time resources corresponding to different uplink BWPs may overlap or not overlap. A specific implementation of performing S303 by the terminal side device is described below based on a relationship between the time resources corresponding to the different BWPs.

In a first design, time resources corresponding to the uplink BWPs do not overlap. In this design, the terminal side device sequentially sends the random access preambles on the uplink BWPs.

Figure 4:
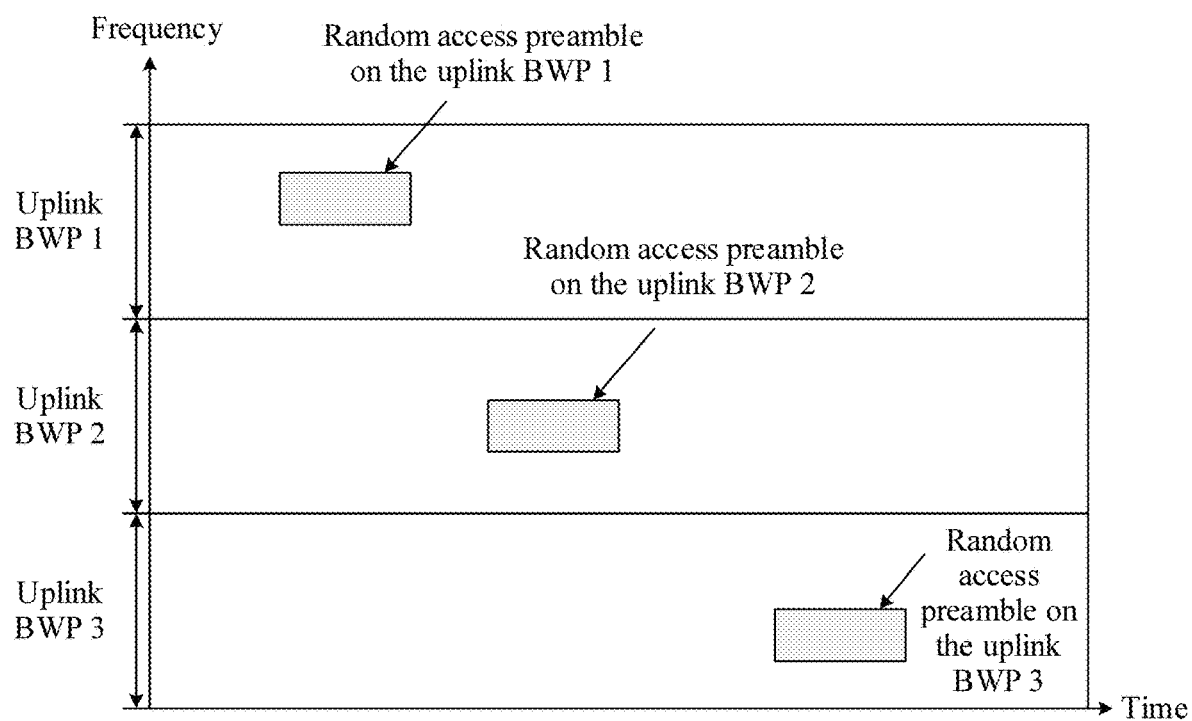
FIG. 4 is an example diagram of a time resource corresponding to a first type of uplink BWP according to an embodiment of this application.

For example, as shown in FIG. 4, when uplink BWPs used for random access in the mobile communications system are an uplink BWP 1, an uplink BWP 2, and an uplink BWP 3 in the figure, the time resources corresponding to the uplink BWPs may not overlap, as shown in FIG. 4.

Optionally, in an implementation of this design, the terminal side device may send the random access preamble on each uplink BWP in the following manner.

The terminal side device sends a random access preamble on an $i^{th}$ uplink BWP.

The terminal side device sends random access preambles on an $(i+1)^{th}$ uplink BWP to an $N^{th}$ uplink BWP within a random access response time window corresponding to the random access preamble on the $i^{th}$ uplink BWP, where i is any integer from 1 to N−2.

Figure 5:
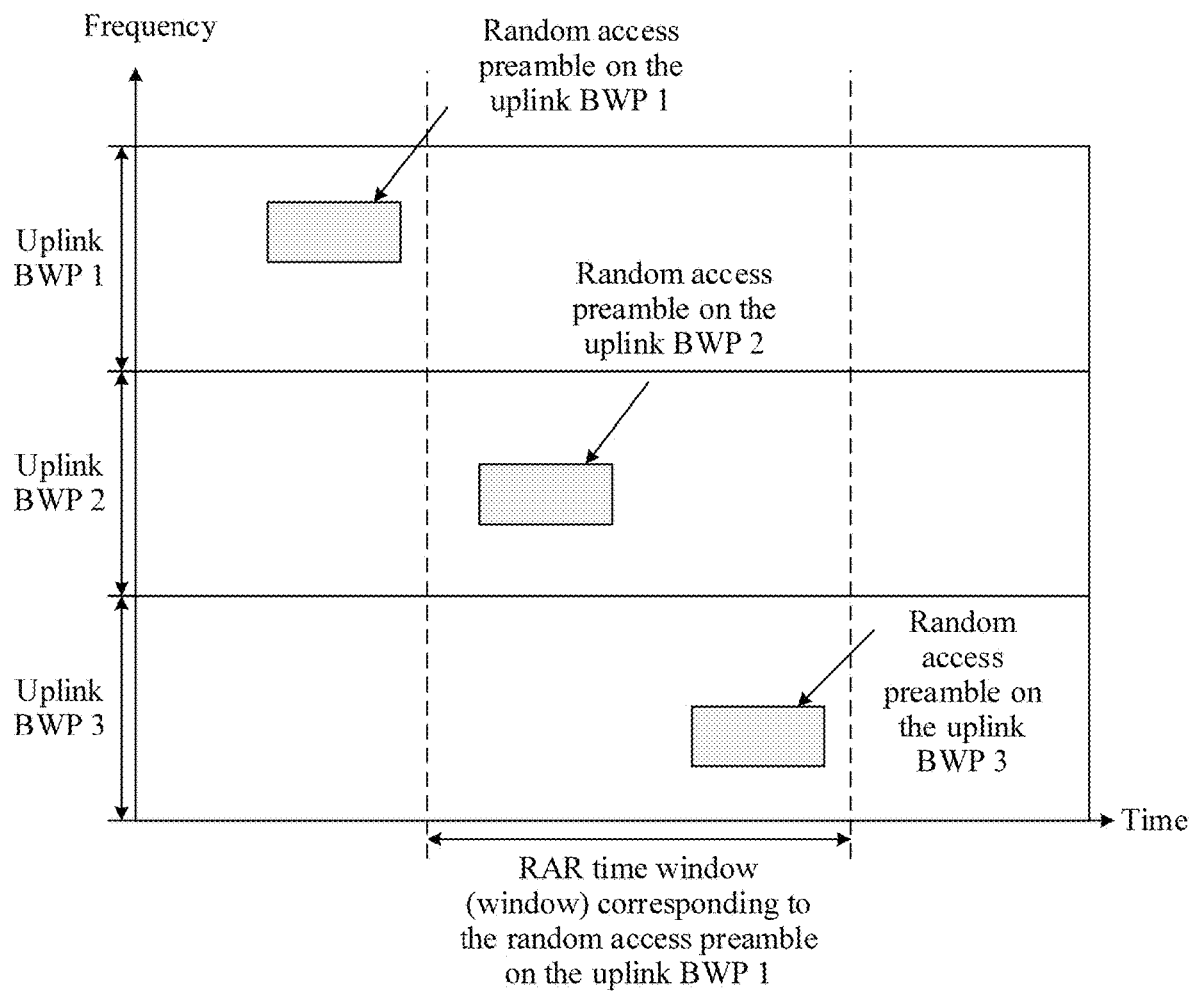
FIG. 5 is an example diagram of a time resource corresponding to a second type of uplink BWP according to an embodiment of this application.

In this implementation, the terminal side device may send a plurality of subsequent random access preambles within a random access response time window corresponding to a specific random access preamble, as shown in FIG. 5.

Optionally, in another implementation of this design, the terminal side device may alternatively send the random access preamble on each uplink BWP in the following manner.

The terminal side device sends a random access preamble on a $i^{th}$ uplink BWP.

The terminal side device sends a random access preamble on a $(j+1)^{th}$ uplink BWP within a random access response time window corresponding to the random access preamble on the $j^{th}$ uplink BWP, where j is any integer from 1 to N−1.

Figure 6:
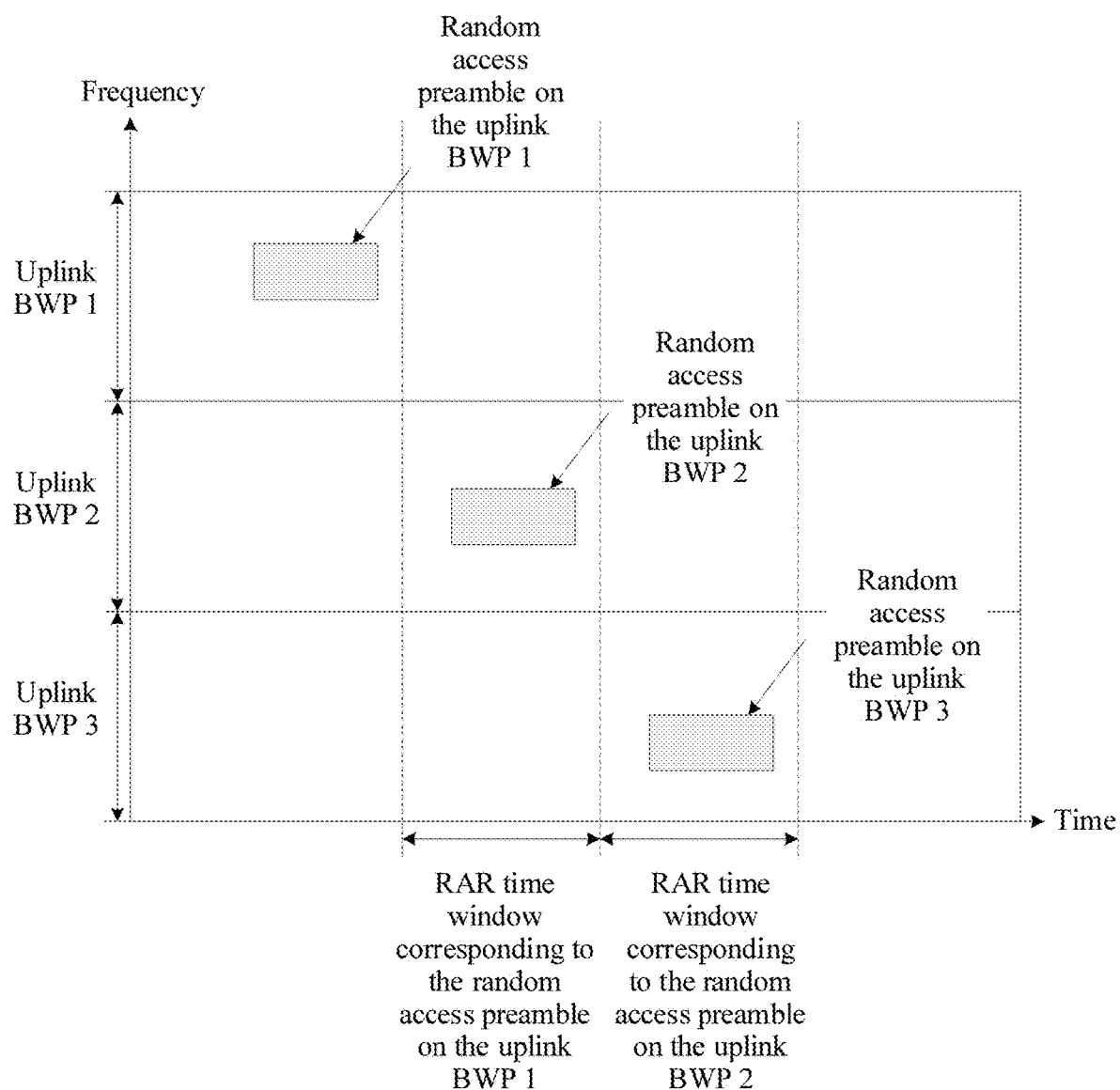
FIG. 6 is an example diagram of a time resource corresponding to a third type of uplink BWP according to an embodiment of this application.

In this implementation, the terminal side device may send a random access preamble within a random access response time window corresponding to a previous random access preamble, as shown in FIG. 6.

In addition, to ensure that the time resources corresponding to the uplink BWPs do not overlap, in this implementation, it needs to be ensured that there is a non-overlapping part between a random access response time window corresponding to any random access preamble and time windows corresponding to random access preambles that are sent consecutively, to ensure that a following random access preamble can be sent in the non-overlapping part.

Figure 7:
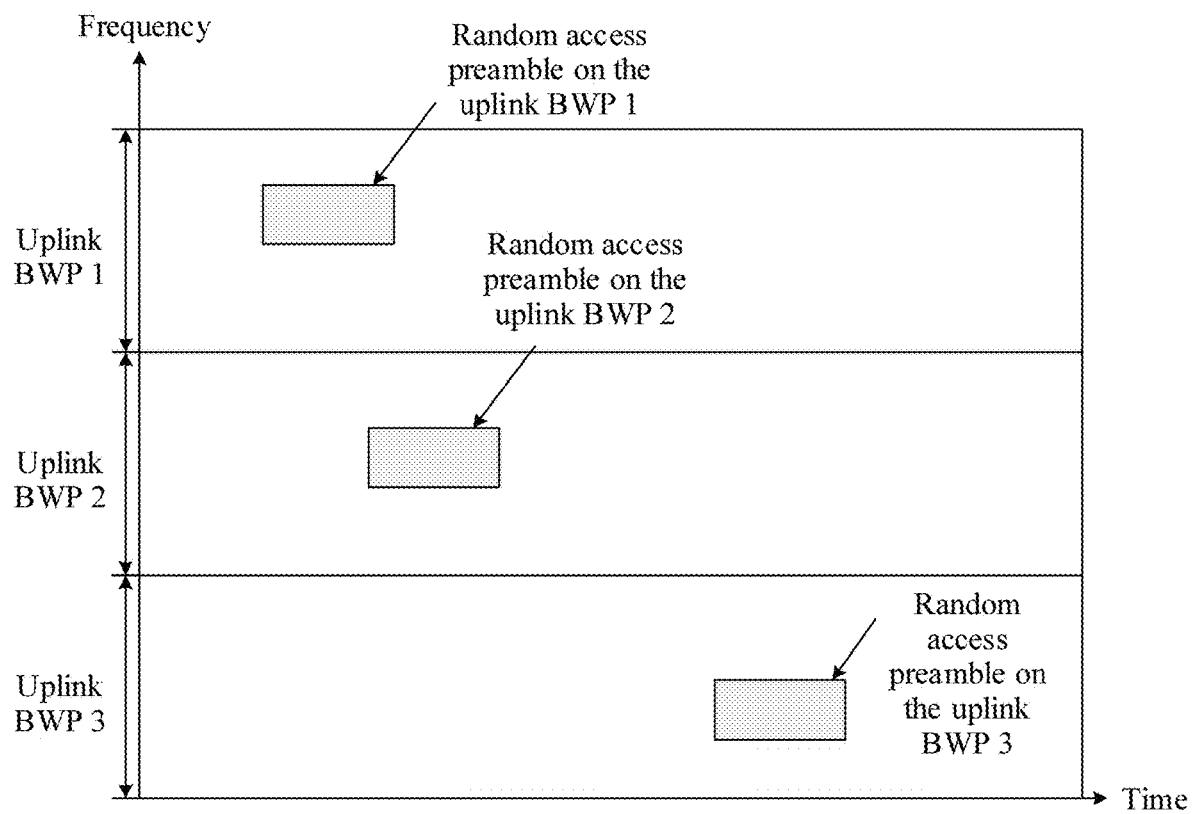
FIG. 7 is an example diagram of a time resource corresponding to a fourth type of uplink BWP according to an embodiment of this application.
Figure 8:
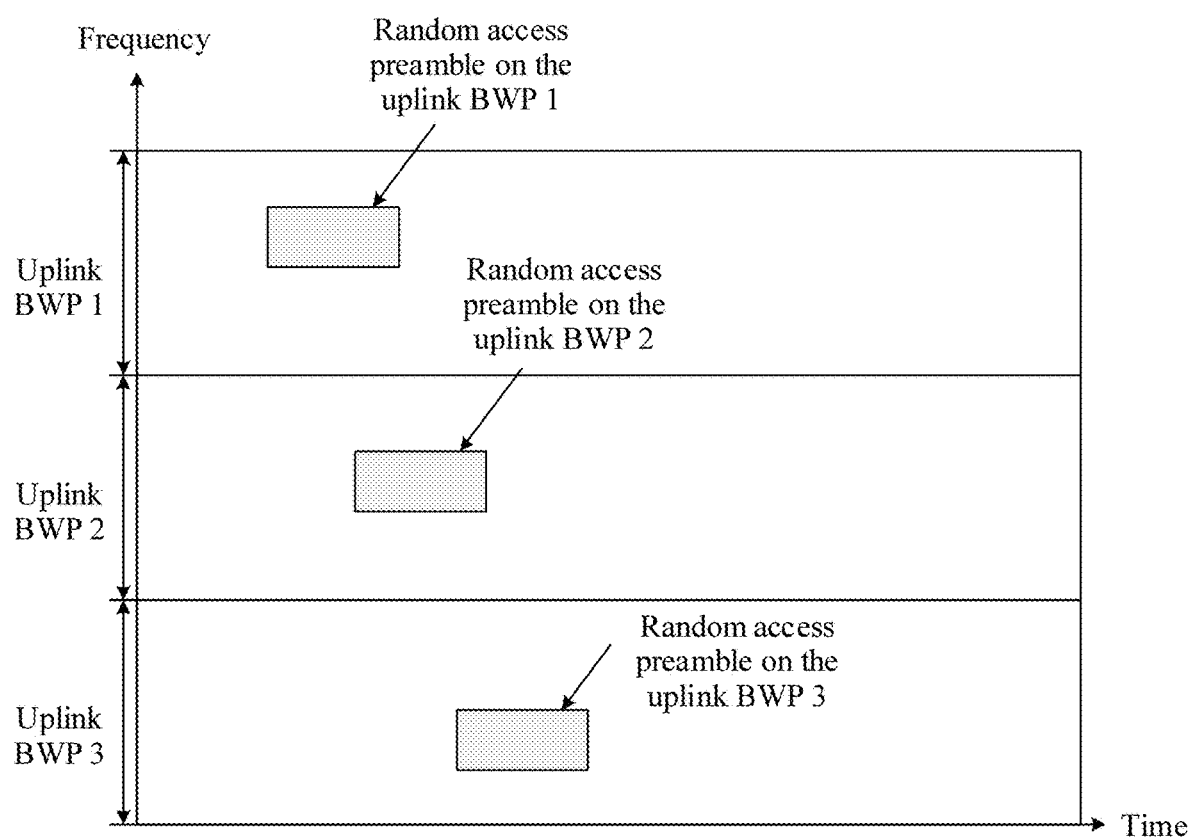
FIG. 8 is an example diagram of a time resource corresponding to a fifth type of uplink BWP according to an embodiment of this application.
Figure 9:
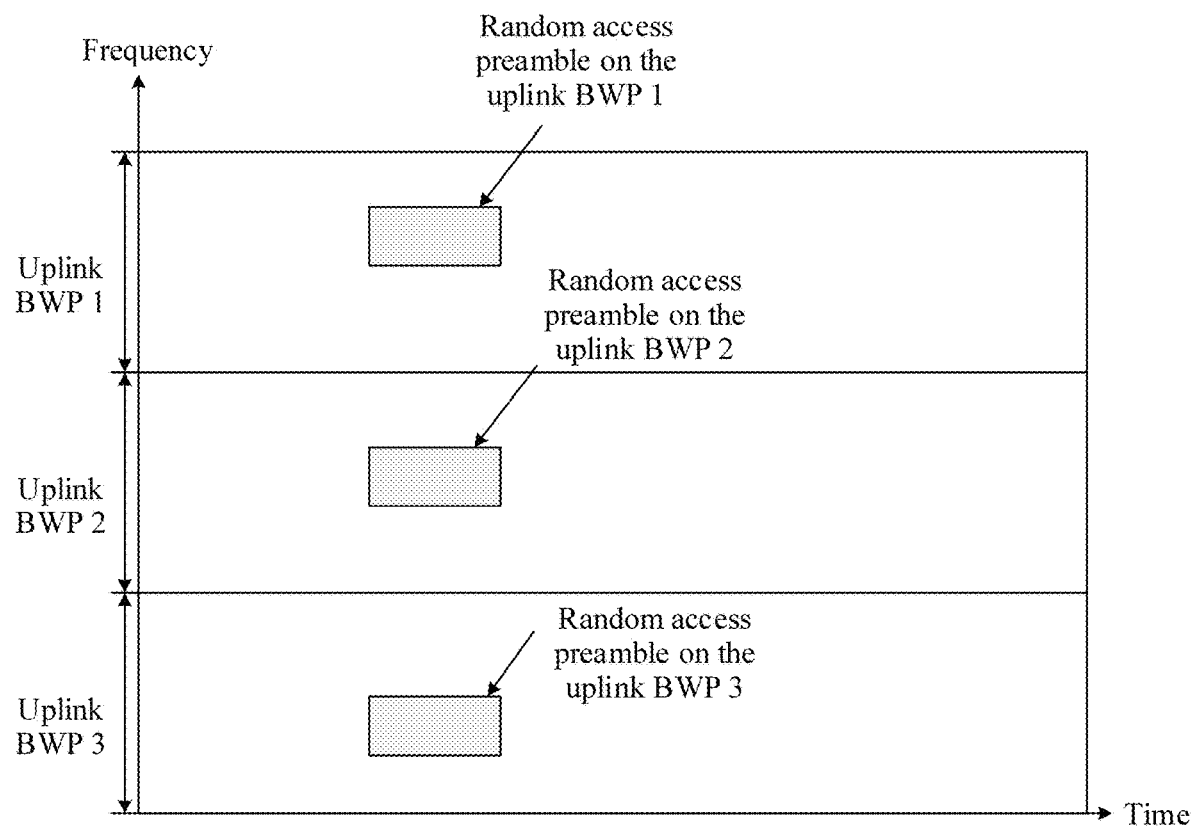
FIG. 9 is an example diagram of a time resource corresponding to a sixth type of uplink BWP according to an embodiment of this application.

In a second design, time resources corresponding to at least two uplink BWPs in the N uplink BWPs overlap. In this design, at some moments, the terminal side device needs to simultaneously send random access preambles on at least two uplink BWPs, as shown in FIG. 7 to FIG. 9.

Optionally, the terminal side device may determine, based on available uplink power of the terminal side device, which of the foregoing designs is used. Further, the terminal side device estimates uplink power on each of the N uplink BWPs and total uplink power available to the terminal side device. When the terminal side device determines that a sum of uplink power on any two uplink BWPs in the N uplink BWPs is greater than the total uplink power available to the terminal side device, the terminal side device uses the first design. When the terminal side device determines that a sum of uplink power on at least two uplink BWPs in the N uplink BWPs is less than or equal to the total uplink power available to the terminal side device, the terminal side device may determine that time resources corresponding to the at least two uplink BWPs overlap, and uses the second design.

The terminal side device may estimate the uplink power on each uplink BWP using the following formula:

$$P_{PRACH, b,f,c}(i) = \min\{P_{CMAX, f,c}(i), P_{PRACH, target, f,c} + PL_{b,f,c}\}.$$

In the formula, $P_{PRACH,b,f,c}(i)$ represents uplink power that is on an uplink BWP b on a carrier f used by the terminal side device in a cell c at an $i^{th}$ moment and that is actually available for sending the random access preamble, $P_{CMAX, f,c}(i)$ represents maximum available total uplink power on the carrier f used by the terminal side device in the cell c at the $i^{th}$ moment, $P_{PRACH,target,f,c}$ represents receive power that is of the random access preamble and that is expected by the network side device on the uplink BWP b on the carrier f used in the cell c, and $PL_{b,f,c}$ represents a path loss between the terminal side device and the network side device on the uplink BWP b on the carrier f used in the cell c.

Based on the foregoing method, when the total uplink power available to the terminal side device is limited (to be specific, $P_{CMAX,f,c}(i) < P_{PRACH,b1,f,c}(i) < P_{PRACH,b2,f,c}(i)$, where b1 and b2 are any two uplink BWPs, for example, when the terminal side device is at a cell edge), the path loss between the terminal side device and the network side device is relatively large. To improve a probability of successfully sending the random access preamble on each uplink BWP, the terminal side device needs to ensure that the random access preamble on the uplink BWP is sent using uplink power greater than or equal to the uplink power on each uplink BWP.

When the total uplink power available to the terminal side device is not limited (for example, the terminal side device is located at a center location of the cell and is relatively close to the network side device), the path loss between the terminal side device and the network side device is relatively small. To reduce a delay of sending the random access preambles on the N uplink BWPs by the terminal side device, the terminal side device may send the random access preambles using the second design.

Optionally, the terminal side device may further use the first design according to an indication of the network side device.

In addition, when the terminal side device uses the second design, an overlapping threshold W may be set in the mobile communications system such that a quantity of random access preambles sent by the terminal side device at each moment is less than W. In this way, a probability of successfully sending the random access preamble on each uplink BWP can be improved. W is a positive integer less than or equal to N. Optionally, W may be stipulated in a protocol or obtained by the terminal side device from the network side device. For example, the terminal side device obtains W from random access configuration information.

Figure 10:
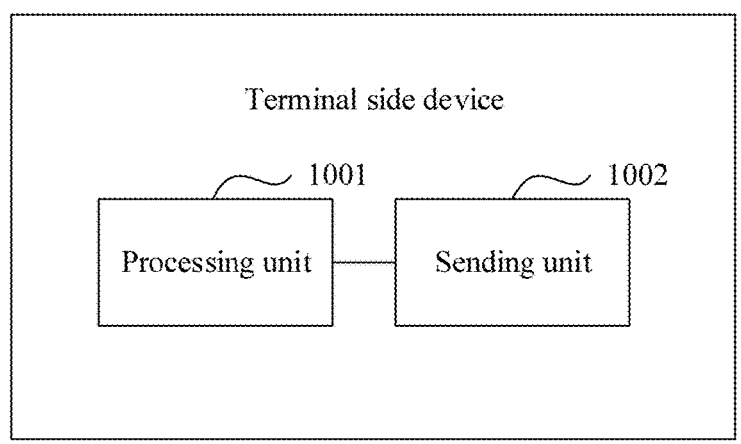
FIG. 10 is a schematic structural diagram of a terminal side device according to an embodiment of this application.

Based on the foregoing embodiments, this application further provides a terminal side device. The terminal side device may be used in the mobile communications system shown in FIG. 1, to implement the communication method shown in FIG. 3. Referring to FIG. 10, the terminal side device includes a processing unit 1001 and a sending unit 1002.

The processing unit 1001 is configured to determine a random access preamble on each of N uplink BWPs in one random access process, where N is an integer greater than or equal to 2.

The sending unit 1002 is configured to send the random access preamble on each uplink BWP to a network side device.

In an optional implementation, time resources corresponding to the uplink BWPs do not overlap. The processing unit 1001 is further configured to, if a sum of uplink power on any two of the N uplink BWPs is greater than total uplink power available to the terminal side device, determine that the time resources corresponding to the uplink BWPs do not overlap.

In another optional implementation, time resources corresponding to at least two uplink BWPs in the N uplink BWPs overlap. The processing unit 1001 is further configured to, if a sum of uplink power on the at least two uplink BWPs is less than or equal to total uplink power available to the terminal side device, determine that the time resources corresponding to the at least two uplink BWPs overlap.

In a possible design, when sending the random access preamble on each uplink BWP to the network side device, the sending unit 1002 is further configured to send a random access preamble on an $i^{th}$ uplink BWP, and send random access preambles on an $(i+1)^{th}$ uplink BWP to an Nth uplink BWP within a random access response time window corresponding to the random access preamble on the $i^{th}$ uplink BWP, where i is any integer from 1 to N−2.

In another possible design, when sending the random access preamble on each uplink BWP to the network side device, the sending unit 1002 is further configured to send a random access preamble on a $i^{th}$ uplink BWP, and send a random access preamble on a $(j+1)^{th}$ uplink BWP within a random access response time window corresponding to the random access preamble on the $j^{th}$ uplink BWP, where j is any integer from 1 to N−1.

In an optional implementation, the terminal side device further includes a receiving unit configured to, after the sending unit 1002 sends the random access preamble on each uplink BWP to the network side device, receive M random access responses sent by the network side device, where M is a positive integer less than or equal to N, the processing unit 1001 is further configured to select a first random access response from the M random access responses, and the sending unit 1002 is further configured to send a first message to the network side device based on the first random access response, where the first message requests contention conflict resolution for random access corresponding to the first random access response.

Optionally, the first random access response is the first random access response received by the terminal side device within a preset first time window, a random access response of best signal quality within a preset second time window, or a random access response that is randomly selected.

Optionally, the sending unit 1002 is further configured to send a second message to the network side device based on a second random access response, where the second message indicates to cancel random access corresponding to the second random access response, and the second random access response is any one of M−1 random access responses other than the first random access response in the M random access responses.

In another optional implementation, the terminal side device further includes a receiving unit configured to receive M random access responses sent by the network side device, where M is a positive integer less than or equal to N, the sending unit 1002 is further configured to send a first message to the network side device based on a $k^{th}$ random access response in the M random access responses, where the first message requests contention conflict resolution for random access corresponding to the $k^{th}$ random access response, and k is an integer ranging from 1 to M.

The terminal side device may further perform other content. For details, refer to related descriptions in FIG. 3. Details are not described herein again.

Figure 11:
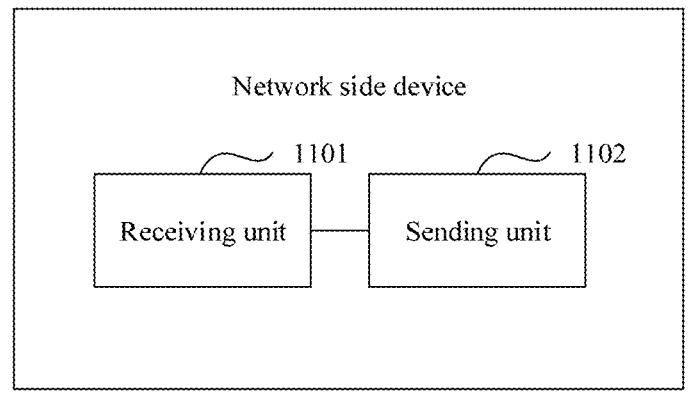
FIG. 11 is a schematic structural diagram of a network side device according to an embodiment of this application.

Based on the foregoing embodiments, this application further provides a network side device. The network side device may be used in the mobile communications system shown in FIG. 1, to implement the communication method shown in FIG. 3. Referring to FIG. 11, the network side device includes a receiving unit 1101 and a sending unit 1102.

The receiving unit 1101 is configured to receive a random access preamble on each of P uplink BWPs from a terminal side device, where the P uplink BWPs are included in N uplink BWPs, N is an integer greater than or equal to 2, and P is a positive integer less than or equal to N.

The sending unit 1102 is configured to send P random access responses to the terminal side device based on the received P random access preambles.

The receiving unit 1101 is further configured to receive a first message in response to a first random access response from the terminal side device, where the first random access response is one of the P random access responses, and the first message requests contention conflict resolution for random access corresponding to the first random access response.

In an optional implementation, the receiving unit 1101 is further configured to receive a second message in response to a second random access response from the terminal side device, where the second random access response is any one of P−1 random access responses other than the first random access response in the P random access responses, and the second message indicates to cancel random access corresponding to the second random access response.

The network side device may further perform other content. For details, refer to related descriptions in FIG. 3. Details are not described herein again.

Figure 12:
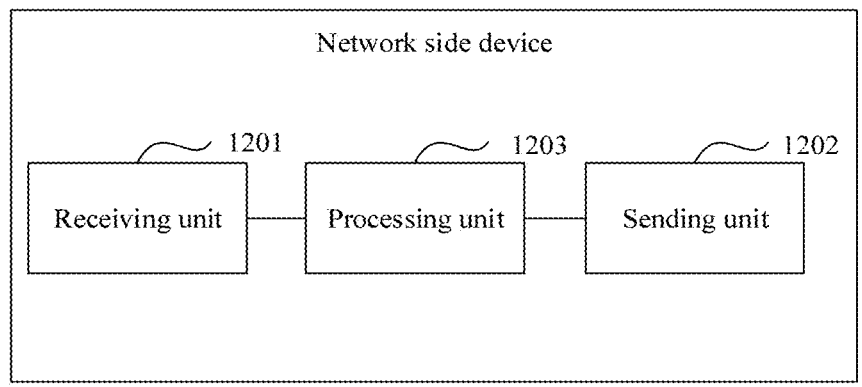
FIG. 12 is a schematic structural diagram of another network side device according to an embodiment of this application.

Based on the foregoing embodiments, this application further provides a network side device. The network side device may be used in the mobile communications system shown in FIG. 1, to implement the communication method shown in FIG. 3. Referring to FIG. 12, the network side device includes a receiving unit 1201, a sending unit 1202, and a processing unit 1203.

The receiving unit 1201 is configured to receive a random access preamble on each of P uplink BWPs from a terminal side device, where the P uplink BWPs are included in N uplink BWPs, N is an integer greater than or equal to 2, and P is a positive integer less than or equal to N.

The sending unit 1202 is configured to send P random access responses to the terminal side device based on the received P random access preambles.

The receiving unit 1201 is further configured to receive L first messages in response to L random access responses from the terminal side device, where the L random access responses are included in the P random access responses, L is a positive integer less than or equal to P, a first message in response to a $k^{th}$ random access response requests contention conflict resolution for random access corresponding to the $k^{th}$ random access response, and k is any integer from 1 to P.

The processing unit 1203 is configured to select a target first message from the L first messages.

The sending unit 1202 is further configured to send a contention conflict resolution message based on the target first message, where the contention conflict resolution message indicates contention conflict resolution for random access corresponding to a random access response to which the target first message responds.

The network side device may further perform other content. For details, refer to related descriptions in FIG. 3. Details are not described herein again.

It should be noted that in the embodiments of this application, division into the modules is an example and is merely logical function division, and may be other division during actual implementation. In addition, function units in the embodiments of this application may be integrated into one processing unit, or may exist alone physically, or two or more units may be integrated into one unit. The integrated unit may be implemented in a form of hardware, or may be implemented in a form of a software functional unit. When the integrated unit is implemented in the form of a software function unit and sold or used as an independent product, the integrated unit may be stored in a computer-readable storage medium. Based on such an understanding, the technical solutions of this application essentially, or the part contributing to the corresponding technology, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

Based on the foregoing embodiments, an embodiment of this application further provides a communications device. The communications device may be a terminal side device or a network side device. The communications device may include a transceiver 1301 and a processor 1302, and optionally, may further include a memory 1303. For details, refer to a structural diagram shown in FIG. 13. It should be understood that the communications device may include at least one processor and at least one memory, and FIG. 13 shows only an example of one processor and one memory.

The processor 1302 may be a central processing unit (CPU), a network processor (NP), a combination of a CPU and an NP, or the like. The processor 1302 may further include a hardware chip. The hardware chip may be an ASIC, a PLD, or a combination thereof. The PLD may be a CPLD, an FPGA, a GAL, or any combination thereof. The processor 1302 implements the foregoing function using hardware, or by executing corresponding software by hardware.

The transceiver 1301 and the processor 1302 are connected to each other. Optionally, the transceiver 1301 and the processor 1302 are connected to each other using a bus 1304. The bus 1304 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 13, but this does not mean that there is only one bus or only one type of bus.

Figure 13:
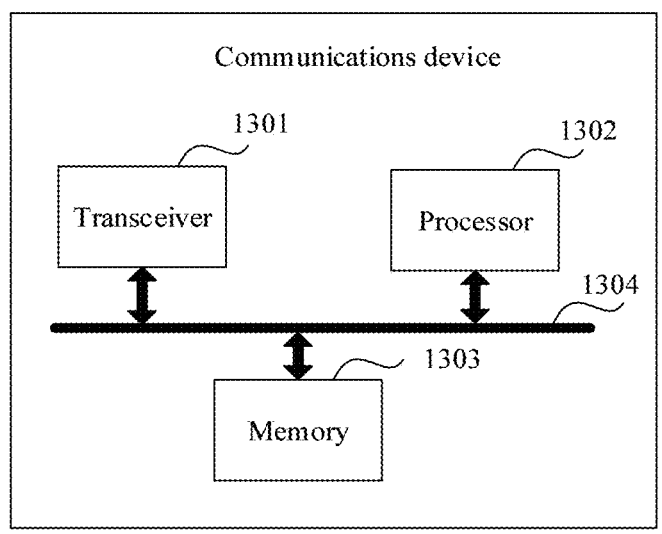
FIG. 13 is a structural diagram of a communications device according to an embodiment of this application.

In an embodiment, the communications device shown in FIG. 13 may be configured to perform an operation of the terminal side device in the embodiment shown in FIG. 3. For example, the processor 1302 is configured to determine a random access preamble on each of N uplink BWPs in one random access process, where N is an integer greater than or equal to 2, and the transceiver 1301 is configured to, when receiving invocation from the processor 1302, send the random access preamble on each uplink BWP to a network side device.

In an optional implementation, time resources corresponding to the uplink BWPs do not overlap. The processor 1302 is further configured to, if a sum of uplink power on any two of the N uplink BWPs is greater than total uplink power available to the terminal side device, determine that the time resources corresponding to the uplink BWPs do not overlap.

In another optional implementation, time resources corresponding to at least two uplink BWPs in the N uplink BWPs overlap. The processor 1302 is further configured to, if a sum of uplink power on the at least two uplink BWPs is less than or equal to total uplink power available to the terminal side device, determine that the time resources corresponding to the at least two uplink BWPs overlap.

In a possible design, when sending the random access preamble on each uplink BWP to the network side device, the transceiver 1301 is further configured to send a random access preamble on an $i^{th}$ uplink BWP, send random access preambles on an $(i+1)^{th}$ uplink BWP to an Nth uplink BWP within a random access response time window corresponding to the random access preamble on the $i^{th}$ uplink BWP, where i is any integer from 1 to N−2.

In another possible design, when sending the random access preamble on each uplink BWP to the network side device, the transceiver 1301 is further configured to send a random access preamble on a $i^{th}$ uplink BWP, and send a random access preamble on a $(j+1)^{th}$ uplink BWP within a random access response time window corresponding to the random access preamble on the $j^{th}$ uplink BWP, where j is any integer from 1 to N−1.

In an optional implementation, the transceiver 1301 is further configured to, after sending the random access preamble on each uplink BWP to the network side device, receive M random access responses sent by the network side device, where M is a positive integer less than or equal to N, the processor 1302 is further configured to select a first random access response from the M random access responses, and the transceiver 1301 is further configured to, when receiving the invocation from the processor 1302, send a first message to the network side device based on the first random access response, where the first message requests contention conflict resolution for random access corresponding to the first random access response.

Optionally, the first random access response is the first random access response received by the terminal side device within a preset first time window, a random access response of best signal quality within a preset second time window, or a random access response that is randomly selected.

Optionally, the transceiver 1301 is further configured to, when receiving the invocation from the processor 1302, send a second message to the network side device based on a second random access response, where the second message indicates to cancel random access corresponding to the second random access response, and the second random access response is any one of M−1 random access responses other than the first random access response in the M random access responses.

In another optional implementation, the transceiver 1301 is further configured to, when receiving the invocation from the processor 1302, receive M random access responses sent by the network side device, where M is a positive integer less than or equal to N, the transceiver 1301 is further configured to send a first message to the network side device based on a $k^{th}$ random access response in the M random access responses, where the first message requests contention conflict resolution for random access corresponding to the le random access response, and k is an integer ranging from 1 to M.

In an optional implementation, the memory 1303 is coupled to the processor 1302, and is configured to store a program and the like. Further, the program may include program code, and the program code includes a computer operation instruction. The memory 1303 may include a RAM, or may be a non-volatile memory, for example, at least one magnetic disk memory. The processor 1302 executes an application program stored in the memory 1303, to implement the foregoing functions, and implement the communication method shown in FIG. 3.

In another embodiment, the communications device shown in FIG. 13 may be configured to perform an operation of the network side device in the embodiment shown in FIG. 3. For example, the transceiver 1301 is configured to, when receiving invocation from the processor 1302, receive a random access preamble on each of P uplink BWPs from a terminal side device, where the P uplink BWPs are included in N uplink BWPs, N is an integer greater than or equal to 2, and P is a positive integer less than or equal to N, when receiving the invocation from the processor 1302, send P random access responses to the terminal side device based on the received P random access preambles, and when receiving the invocation from the processor 1302, receive a first message in response to a first random access response from the terminal side device, where the first random access response is one of the P random access responses, and the first message requests contention conflict resolution for random access corresponding to the first random access response.

In an optional implementation, the transceiver 1301 is further configured to, when receiving the invocation from the processor 1302, receive a second message in response to a second random access response from the terminal side device, where the second random access response is any one of P−1 random access responses other than the first random access response in the P random access responses, and the second message indicates to cancel random access corresponding to the second random access response.

In an optional implementation, the memory 1303 is coupled to the processor 1302, and is configured to store a program and the like. Further, the program may include program code, and the program code includes a computer operation instruction. The memory 1303 may include RAM, or may be a non-volatile memory, for example, at least one magnetic disk memory. The processor 1302 executes an application program stored in the memory 1303, to implement the foregoing functions, and implement the communication method shown in FIG. 3.

In still another embodiment, the communications device shown in FIG. 13 may be configured to perform an operation of the network side device in the embodiment shown in FIG. 3. For example, the transceiver 1301 is configured to, when receiving invocation from the processor 1302, receive a random access preamble on each of P uplink BWPs from a terminal side device, where the P uplink BWPs are included in N uplink BWPs, N is an integer greater than or equal to 2, and P is a positive integer less than or equal to N, send P random access responses to the terminal side device based on the received P random access preambles, and receive L first messages in response to L random access responses from the terminal side device, where the L random access responses are included in the P random access responses, L is a positive integer less than or equal to P, a first message in response to a le random access response requests contention conflict resolution for random access corresponding to the $k^{th}$ random access response, and k is any integer from 1 to P, the processor 1302 is configured to select a target first message from the L first messages, and the transceiver 1301 is further configured to, when receiving the invocation from the processor 1302, send a contention conflict resolution message based on the target first message, where the contention conflict resolution message indicates contention conflict resolution for random access corresponding to a random access response to which the target first message responds.

In an optional implementation, the memory 1303 is coupled to the processor 1302, and is configured to store a program and the like. Further, the program may include program code, and the program code includes a computer operation instruction. The memory 1303 may include RAM, or may be a non-volatile memory, for example, at least one magnetic disk memory. The processor 1302 executes an application program stored in the memory 1303, to implement the foregoing functions, and implement the communication method shown in FIG. 3.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc (CD) ROM (CD-ROM), an optical memory, and the like) that include computer usable program code.

The embodiments of the present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

A person skilled in the art can make various modifications and variations to embodiments of the present disclosure without departing from the spirit and scope of this application. This application is intended to cover these modifications and variations provided that they fall within the scope of protection defined by the following claims and their equivalent technologies.

What is claimed is:

1. A method implemented by a terminal side device, wherein the method comprises:
   determining N random access preambles on N uplink bandwidth parts (BWPs) in a random access process, wherein N is an integer greater than or equal to 2;
   determining a plurality of time resources corresponding to the N uplink BWPs; and
   sending, using the time resources, the N random access preambles to a network side device,
   wherein the method further comprises one of:
      identifying that a sum of uplink powers on any two of the N uplink BWPs is greater than a total uplink available to the terminal side device and determining, based on the identifying, that the time resources do not overlap, or
      identifying that a sum of uplink powers on at least two uplink MVPs is less than or equal to a total uplink power available to the terminal side device, and determining, based on the identifying, that the at least two of the time resources overlap.

2. The method of claim 1, wherein the time resources do not overlap.

3. The method of claim 2, further comprising:
   sending a first random access preamble on an $i^{th}$ uplink BWP, wherein the first random access preamble is of the N random access preambles; and
   sending second random access preambles on an $(i+1)^{th}$ uplink BWP to an $N^{th}$ uplink BWP within a random access response time window corresponding to the first random access preamble, wherein i is any integer from 1 to N−2, and wherein the second random access preambles are of the N random access preambles.

4. The method of claim 2, further comprising:
   sending a first random access preamble on a $j^{th}$ uplink BWP, wherein the first random access preamble is of the N random access preambles; and
   sending a second random access preamble on a $(j+1)^{th}$ uplink BWP within a random access response time window corresponding to the first random access preamble, wherein j is any integer from 1 to N−1, and wherein the second random access preamble is of the N random access preambles.

5. The method of claim 1, wherein at least two time resources corresponding to at least two uplink BWPs in the N uplink BWPs overlap.

6. The method of claim 1, wherein after sending the N random access preambles, the method further comprises:
   receiving M random access responses from the network side device, wherein M is a positive integer less than or equal to N;
   selecting a first random access response from the M random access responses; and
   sending a first message to the network side device based on the first random access response, wherein the first message requests a contention conflict resolution for random access corresponding to the first random access response.

7. The method of claim 1, further comprising:
receiving M random access responses from the network side device, wherein M is a positive integer less than or equal to N; and
sending a first message to the network side device based on a $k^{th}$ random access response in the M random access responses, wherein the first message requests a contention conflict resolution for random access corresponding to the $k^{th}$ random access response, and wherein k is any integer from 1 to M.

8. An apparatus comprising:
a memory configured to store instructions; and
a processor coupled to the memory, wherein the instructions cause the processor to be configured to:
   determine N random access preambles on N uplink bandwidth parts (BWPs) in a random access process, wherein N is an integer greater than or equal to 2;
   determine a plurality of time resources corresponding to the N uplink BWPs; and
   send, using the time resources, the N random access preambles to a network side device,
   wherein the instructions further cause the processor to be configured to perform one of:
   identify that a sum of uplink powers on any two of the N uplink BWPs is greater than a total uplink power available to the terminal side device and determine, based on the identifying, that the time resources do not overlap, or
   identifying that a sum of uplink powers on at least two uplink BWPs is less than or equal to a total uplink power available to the terminal side device, and determining, based on the identifying, that the at least two of the time resources overlap.

9. The apparatus of claim 8, wherein the time resources corresponding to the N uplink BWPs do not overlap.

10. The apparatus of claim 9, wherein the instructions further cause the processor to be configured to:
send a first random access preamble on an $i^{th}$ uplink BWP, wherein the first random access preamble is of the N random access preambles; and
send a second random access preambles on an $(i+1)^{th}$ uplink BWP to an $N^{th}$ uplink BWP within a random access response time window corresponding to the first random access preamble, wherein i is any integer from 1 to N−2, and wherein the second random access preambles are of the N random access preambles.

11. The apparatus of claim 9, wherein the instructions further cause the processor to be configured to:
send a first random access preamble on a $j^{th}$ uplink BWP, wherein the first random access preamble is of the N random access preambles; and
send a second random access preamble on a $(j+1)^{th}$ uplink BWP within a random access response time window corresponding to the first random access preamble, wherein j is any integer from 1 to N−1, and wherein the second random access preamble is of the N random access preambles.

12. The apparatus of claim 8, wherein at least two time resources corresponding to at least two uplink BWPs in the N uplink BWPs overlap.

13. The apparatus of claim 8, wherein the instructions further cause the processor to be configured to:
receive M random access responses from the network side device, wherein M is a positive integer less than or equal to N;
select a first random access response from the M random access responses; and
send a first message to the network side device based on the first random access response, wherein the first message requests a contention conflict resolution for random access corresponding to the first random access response.

14. The apparatus of claim 8, wherein the instructions further cause the processor to be configured to:
receive M random access responses from the network side device, wherein M is a positive integer less than or equal to N; and
send a first message to the network side device based on a $k^{th}$ random access response in the M random access responses, wherein the first message requests a contention conflict resolution for random access corresponding to the $k^{th}$ random access response, and wherein k is any integer from 1 to M.

15. An apparatus comprising:
a memory configured to store instructions; and
a processor coupled to the memory, wherein the instructions cause the processor to be configured to:
   receive P random access preambles on P uplink bandwidth parts (BWPs) from a terminal side device, wherein the P uplink BWPs are part of N uplink BWPs, wherein N is an integer greater than or equal to 2, and wherein P is a positive integer less than or equal to N;
   send P random access responses to the terminal side device based on the P random access preambles, wherein the P random access responses comprise a first random access response; and
   receive a first message from the terminal side device and in response to the first random access response, wherein the first message requests a contention conflict resolution for random access corresponding to the first random access response
   wherein the instructions further cause the processor to be configured to receive a second message in response to a second random access response from the terminal side device, wherein the second random access response is one of P−1 random access responses other than the first random access response in the P random access responses, and wherein the second message indicates to cancel random access corresponding to the second random access response.

* * * * *

UNITED STATES PATENT AND TRADEMARK OFFICE
CERTIFICATE OF CORRECTION

PATENT NO. : 11,540,332 B2
APPLICATION NO. : 17/179743
DATED : December 27, 2022
INVENTOR(S) : Han Zhou and Meng Hua It is certified that error appears in the above-identified patent and that said Letters Patent is hereby corrected as shown below:

On the Title Page

Page 2, item [56], "R2-1811281, Cothenburg," should read "R2-1811281, Gothenburg,"

In the Claims

Claim 1, Column 28, Line 27: "uplink MVPs is less" should read "uplink BWPs is less"

Claim 8, Column 29, Line 26: "side device and determine," should read "side device, and determine,"

Signed and Sealed this
Fourteenth Day of February, 2023

Katherine Kelly Vidal
*Director of the United States Patent and Trademark Office*